J. M. O'NEALL.
WASHING MACHINE.
APPLICATION FILED AUG. 16, 1907.

919,629.

Patented Apr. 27, 1909.

WITNESSES:

INVENTOR
James M. O'neall.
BY John M. Hellman
ATTORNEY

UNITED STATES PATENT OFFICE.

JAMES M. O'NEALL, OF DALLAS, TEXAS.

WASHING-MACHINE.

No. 919,629.    Specification of Letters Patent.    Patented April 27, 1909.

Application filed August 16, 1907. Serial No. 388,802.

*To all whom it may concern:*

Be it known that I, JAMES M. O'NEALL, a citizen of the United States, residing at Dallas, in the county of Dallas and State of Texas, have invented certain new and useful Improvements in Washing-Machines, of which the following is a specification.

My invention relates to new and useful improvements in washing machines.

The object of the invention is to provide a washing machine of the class employing a funnel arranged in a containing or boiling receptacle, which is operated by the application of heat to the bottom of the receptacle, which causes a forcible circulation of the water through and about the funnel.

One of the essential features of my invention is to provide a funnel surrounding a chimney and supported above the bottom of the receptacle and secured against movement therein, which causes the water to be elevated in the funnel and forcefully delivered from the top thereof, thus causing it to fall with considerable pressure on the articles to be cleansed, and accelerating the circulation.

A still further feature resides in the provision of means for agitating the articles to be cleansed, and raising them against the body of falling water.

Finally, the object of the invention is to provide a device of the character described that will be strong, durable, efficient and simple, and comparatively inexpensive to make, and one in which the several parts will not be liable to get out of working order.

Figure 1:
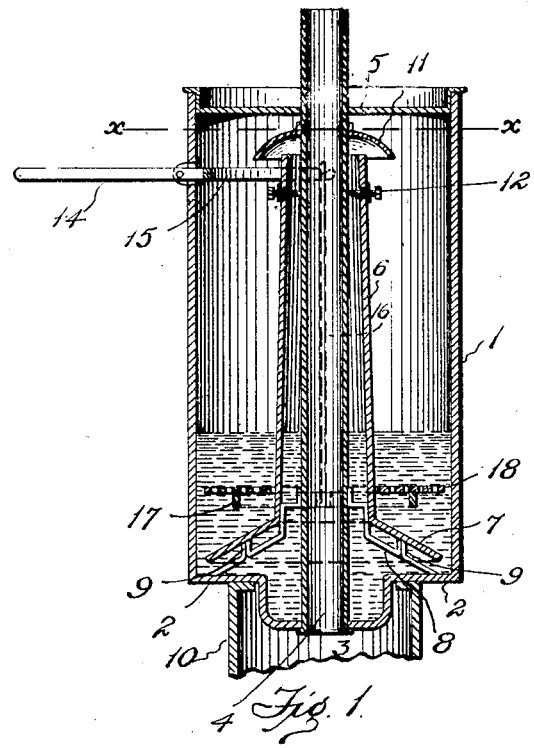
Figures 2, 3:
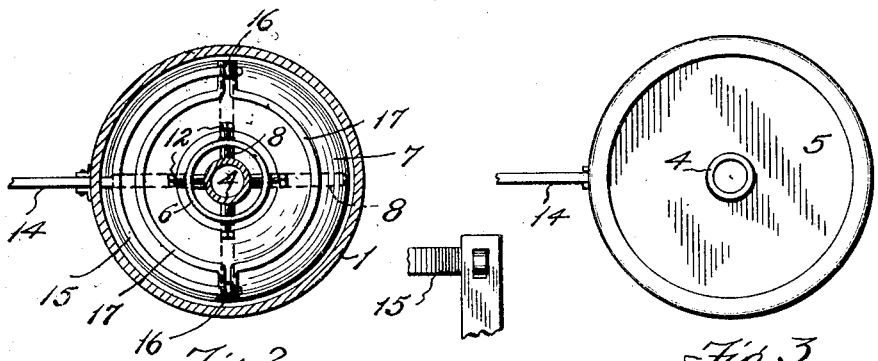
Figure 4:
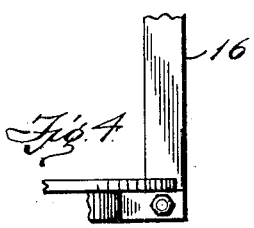

With the above and other objects in view, the invention has particular relation to certain novel features, an example of which is described in the specification, and illustrated in the accompanying drawings, wherein:

Figure 1 is a vertical sectional view, Fig. 2 is a horizontal sectional view taken on the line x—x of Fig. 1, the perforated washer plate and deflector being removed, Fig. 3 is a plan view, and Fig. 4 is a detailed elevation of a portion of the agitating mechanism.

In the drawings, the numeral 1 designates a metallic cylindrical containing or boiling receptacle, which however, may be of any suitable shape and material. This receptacle is provided with a flat bottom portion 2 which extends from a central depending bowl portion 3 having a diameter considerably less than that of the receptacle which forms an important part, as will be hereinafter explained. Through the center of this bowl a tubular chimney 4 extends up through the receptacle terminating above the upper end of the same, a water-tight joint being formed between the bowl and the chimney, as is obvious. The upper end of the chimney passes snugly through a cup shaped cover 5 which fits reasonably tight within the upper end of the receptacle forming a closure therefor, and supporting the chimney. This cover, it will be understood, while being removable, should fit tight enough to prevent to a reasonable extent, the escape of steam, although it is not pressure tight.

It will be understood that the chimney 4 is considerably smaller in diameter than the receptacle 1, so as to provide a large space therebetween. About the chimney a funnel 6 is disposed. This funnel converges upwardly and is of course inverted. At its lower end it is provided with a downwardly flaring base 7 the diameter of which is considerably larger than that of the funnel proper, but which however, is of such size as to permit a free passage of water between the outer edge of the base and the inner walls of the receptacle. It is desirable and necessary that this base be supported above the bottom 2. To effect this a plurality of shouldered braces 8 are secured at their upper ends and have their outer and lower ends resting on the bottom 2, the shouldered portions projecting into the funnel and holding the same in place. These braces are formed with vertical lugs 9 on which the base rests. In this way the liquid in the vessel may freely circulate around and beneath the base of the funnel. It will be here noted that the diameter of the bowl 3 is but slightly greater than that of the funnel 6 at the top but considerably less than that of the base of the funnel. The vessels is supported on a suitable furnace 10 which has an opening just large enough to receive the bowl 3, so that the hottest part of the fire is directed against the bowl, and the bottom 2 projecting beyond the furnace, is subjected to comparatively little heat. The result of this construction and arrangement is that the greatest heat is applied to the liquid in the bowl, which causes the liquid to boil and pass up in the funnel 6, thereby being elevated. The liquid above the base 9 and the outside of the funnel being comparatively cool, will be drawn down into the bowl and elevated, as will be apparent. As the liquid in the funnel is elevated and the size of the column reduced by the converging conformation, its force of movement is increased so that it passes over the upper edge of the funnel with considerable power. The funnel terminates below the cover 5 and in this space a downwardly curved deflector 11 is mounted on the chimney 4. The liquid emerging from the funnel strikes this deflector and is directed downward with increased force. A complete circuit is thus established as the liquid is again drawn down into the bowl as will be apparent, and the circulation maintained as long as the heat beneath the bowl 3 is sustained. It is obvious that the funnel would be carried upward by the elevation of the liquid, and it is equally apparent that the proper action can not be secured unless the funnel is held against movement. The funnel might be secured in various ways, and in the drawings I have shown set screws 12 suitably passed through the funnel so as to bind against the chimney 4, thus holding the funnel against movement and providing for the removal of the same for the purpose of cleansing.

The articles to be cleansed are placed in the receptacle between the funnel and the inner walls thereof. For agitating these articles and assisting in the cleansing, I pivotally mount at one side of the upper end of the receptacle, a lever 14 projecting through the same and carrying at its upper end a yoke 15 conforming to the inner contour of the receptacle and extending substantially half way therearound, as clearly shown in Fig. 2. The ends of this yoke are loosely engaged in the upper ends of vertical links 16 extending down at each side of the receptacle and having their lower ends clamped between the ends of a split ring 17, which is of such diameter as to dispose it substantially equi-distant from the funnel and the inner walls of said receptacle.

The receptacle being partially filled with the liquid some distance above this ring, and the articles to be cleansed placed in the receptacle, it is apparent that in the case of clothing and fabrics, the same will rest on the ring so that by swinging the lever 14 up and down, the ring 17 and consequently the said articles will be agitated or moved vertically through the liquid. Where it is desired to cleanse dishes and other similar articles, a perforated washer plate 18 is suitably mounted on the ring 17 which prevents said articles from falling below the ring and affords a more efficacious agitation of the same. It will be observed that the articles being cleansed may be raised against the body of the liquid falling from the upper end of the funnel and directed downward by the deflector 11. Such an action is very desirable as the articles are subjected to the combined force of the raising movement and the falling body of the water, so that not only the cleansing is more readily and thoroughly accomplished, but an efficient and rapid circulation of the liquid is effected.

What I claim, is:—

1. In a washing machine, the combination with a boiling vessel, of a chimney extending therethrough, and an inverted funnel rigidly secured in the vessel about the chimney.

2. In a washing machine, the combination with a boiling vessel, of a chimney extending therethrough, an inverted funnel rigidly mounted about said chimney, and providing a liquid elevating space therebetween, and a deflector arranged above the funnel.

3. In a washing machine, the combination with a boiling receptacle, of a chimney extending through the receptacle, an inverted funnel rigidly mounted within the receptacle and about the chimney, and an agitating device arranged in the receptacle outside of the funnel.

4. In a washing machine, the combination with a furnace, of a boiling receptacle having a portion depending in the furnace, a portion extending beyond the sides of the furnace, a chimney extending from the depending portion through the receptacle, and an inverted funnel surrounding the chimney and held against movement and having a base considerably larger than the depending portion.

In testimony whereof I have signed my name to this specification in the presence of two subscribing witnesses.

JAMES M. O'NEALL.

Witnesses:
E. V. HARDWAY,
M. HEAFER.